Figure 1:
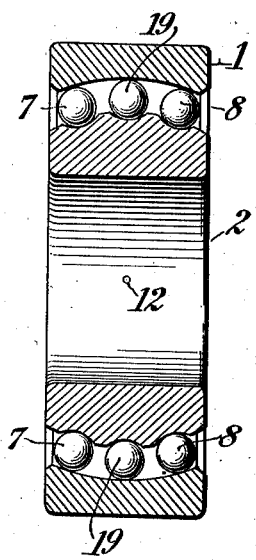

S. G. WINGQUIST.
BALL BEARING.
APPLICATION FILED JAN. 19, 1918.

1,307,799.

Patented June 24, 1919.

WITNESSES:
René Bruine
J. Hallad

INVENTOR:
Sven Gustaf Wingquist
By Attorneys,
Fraser, Dark & Myers

UNITED STATES PATENT OFFICE.

SVEN GUSTAF WINGQUIST, OF GOTTENBORG, SWEDEN, ASSIGNOR TO AKTIEBOLAGET SVENSKA KULLAGERFABRIKEN, OF GOTTENBORG, SWEDEN.

BALL-BEARING.

1,307,799. Specification of Letters Patent. Patented June 24, 1919.

Original application filed August 28, 1907, Serial No. 390,416. Divided and this application filed January 19, 1918. Serial No. 212,725.

*To all whom it may concern:*

Be it known that I, SVEN GUSTAF WINGQUIST, a subject of the King of Sweden, residing in Gottenborg, Sweden, have invented certain new and useful Improvements in Ball-Bearings, of which the following is a specification.

This invention relates to a combined radial and thrust ball bearing and has for its object to provide in a self-contained and compact structure of this kind a bearing preferably self-alining, in which there are balls provided for sustaining the radial load and also balls for resisting or receiving longitudinal or axial thrust, there being a separate series of balls for receiving the thrust in each direction, since it is well known to those familiar with this art that the balls taking thrust in both directions are short lived. It is also well known that in many situations it is desirable that the balls required to resist the thrust of the shaft should not be compelled to completely sustain the radial load, and conversely, that those sustaining the radial load should not be compelled to wholly resist the thrust of the shaft when this is quite excessive. A further object of the invention is to provide a combined radial and thrust bearing which is self-alining and one wherein the balls may be inserted between and removed from the rings by a simple tilting of one of these relatively to the other.

The subject matter of this application is divided from my application, Serial No. 390,416, filed August 28, 1907, for ball bearings, and is more particularly divided from my co-pending application, Serial No. 695,681, filed May 7, 1912, as a division of my said application, Serial No. 390,416.

In the drawings accompanying this specification, an embodiment of my invention is illustrated,—

Figure 2:
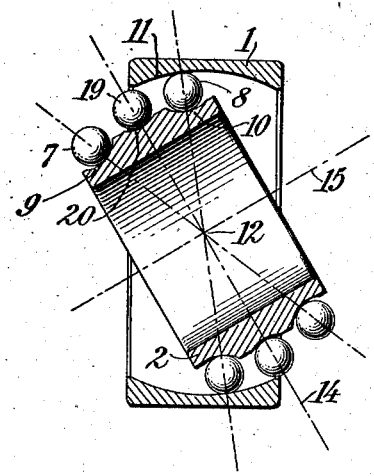
Figure 3:
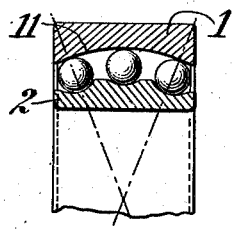

Figure 1 of such drawings being a transverse sectional view taken axially through the bearing;

Fig. 2 is a view of a bearing somewhat similar to that shown in Fig. 1 and of a similar section, but showing the members of the bearing adjusted at angles one to the other to facilitate the insertion or removal of the interposed balls; and Fig. 3 is a view in transverse axial section of the upper part of one of the bearings for the purpose of illustrating certain details of the invention.

As shown in these drawings, the improved bearing, which is a combined radial and thrust bearing, is provided with inner and outer rings or bearing members 2 and 1, the former of which is centrally perforated to permit of being conveniently connected with a shaft or the like, although, if desired, it may be integrally produced upon such shaft. Each of these members, in the form of the invention illustrated, is produced from an integral annular part. The outer ring or member 1 is provided upon its inner face with a track surface 11 which is extended around the inner surface of said inner member and presents a series of internal, concentric, unbroken, permanently related, spherical bearing surfaces, which are struck from the same central point 12 which is positioned at the rotative axis of the inner ring or member 2, as indicated in Figs. 1 and 2, the spherical bearing surface of each of such tracks 11 forming substantially a continuation of the spherical bearing surface of the other track 11 in the form of the invention illustrated herein. The center point 12, for convenience, may be referred to as the center of oscillatory movement or the oscillatory center of the improved bearing. The inner bearing member 2 is of a diameter sufficiently small to permit of being turned or oscillated freely within the outer member 1 and around the oscillatory center 12, and is provided on its perimetral surface with spaced, unbroken grooves or tracks 9, 20 and 10. The grooves form unbroken, permanently related track faces adapted each to receive an annular series of balls—7, 19 and 8 respectively, the structure being such that when the parts are assembled with the said three series of balls engaged in the respective grooves of the inner ring or member, said inner ring or member 2 is adapted for universal movement inside of the outer ring or member 1, each series of balls being adapted during such universal movement to freely traverse the spherical bearing surfaces of the respective tracks upon the face 11 of the outer ring or member in both circumferential and transverse directions.

The inner ring or member 2 and the series of balls 7 and 8 are so arranged with relation to the spherical bearing surface 11 of the outer ring or member 1 that the center from which said spherical bearing surfaces of said tracks are struck is positioned in the illustration substantially mid-way between the respective series of balls 7 and 8, which are thereby caused to traverse parallel paths at opposite sides of such center.

The annular grooves or channels 9, 20 and 10 of the inner ring or member 2 afford tracks which are traversed by the balls of the three annular series 7, 19 and 8, and as herein shown, such grooves or channels are formed with concave curved surfaces in profile, struck with radii greater than those of the balls traversing them, and the track surfaces are of such shape that the contact points of each ball with both rings are on a radius of the curvature of the inner surface 11, whereby the respective contact points of the several balls with both rings are on radii convergent to the center of curvature of said inner surface 11 so that each ball in each series contacts with the track of the inner member 2 only at a single point opposite to that whereat it contacts with the corresponding track of the outer member, thus producing a two-point bearing whereby a regulated rolling movement of the balls during the use of the improved bearing is assured and the wear resulting from such usage is distributed uniformly over the surfaces of the balls and is not imposed thereon in such an unequal manner as to tend to cut or deform the surfaces of said balls. By this construction and arrangement of the parts it will be evident that the annular tracks or bearing surfaces of the face 11, wherewith the respective ball sets or series 7 and 8 are engaged, are reversely inclined to the rotative axis 15 of the inner ring or member 2. The inner surfaces of the grooves or channels 9 and 10 of the inner ring or member 2 present oppositely arranged shoulders adjacent and opposite to said reversely inclined tracks of the bearing surface 11, so that said respective ball sets or series, 7 and 8, are held in the grooves of said inner ring or member and permitted to operate by their engagement between the said reversely inclined tracks or bearing surfaces of the face 11, and the corresponding shoulder afforded by the surfaces of the grooves 9 and 10 to hold said inner ring or member securely against movement in an axial direction so as to overcome effectually the effects of end thrusts in either direction along the shaft whereon the said inner ring or member is mounted.

In the form of the invention illustrated in the drawings, the balls of the series 7, 19 and 8 are shown of the same size. The balls of the series 7 and 8 primarily designed to take the end thrust in the respective directions, but nevertheless in most instances coöperate with the balls of the center series 11 in sustaining the radial load, are of the same size as the balls of such center series in the present showing.

The bearing illustrated is shown symmetrical on both sides of the center plane represented by the line 14, such center plane being the plane of the series of balls 19, which plane contains the center point 12 of the bearing, such point being located within the bearing on the center line 15.

The universal movement of the inner ring or member and of its ball sets or series around the oscillatory center point 12 which is the center of curvature of the inner surface 11 and, in contact with the internal spherical surface of the outer member, enables the improved bearing to compensate automatically for any ordinary defect of alinement and to accommodate transverse strains placed upon the shaft whereon the inner ring or member is mounted, and the positioning of the respective ball sets or series 7 and 8 at opposite sides of the said oscillatory point 12 and in contact with the reversely inclined tracks or bearing faces of the surface 11, and the series of balls 19 of the intermediate set also contacting upon a track face on the same surface 11, affords an extremely strong and compact structure of the parts, and enables the device to be employed as a combined radial and thrust bearing since if end-wise strain is applied to the shaft in one direction, as for example, toward the right in Fig. 1, such end-wise thrust or strain is taken up and borne by the ball set or series 8 and the track face 11, wherewith the same contacts, while at the same time the intermediate set or series of balls 19 acts to sustain the radial load. In this bearing the lateral thrust is taken up primarily by the center or intermediate series of balls, while the end thrust is taken up by the outer series of balls depending upon the direction in which the thrust is received by the bearing. Assuming the outer ring to be fixed and the inner ring to be the moving member, if the thrust should be from the right hand, then the left hand series of balls acts to take up the thrust, and if the thrust is from the left hand side, then the right hand series of balls operates to take the thrust. In some instances, when the thrust is taken up by one of the outer series of balls, the series on the other side is substantially idle so far as thrust is concerned. It necessarily follows from the location of the third ball set intermediate the two outer sets that the plane of the intermediate ball set is nearer the center of curvature of the ball track than the plane of either of the two outer sets. In the actual operation of the device, even though all three ball sets are effective in receiving pressures transmitted through the axis of the bearing, the intermediate ball set necessarily receives greater transverse pressure than either of the outer ball sets, and in end thrusts along the axis of the shaft, it receives less pressure.

Having described my invention, I claim:—

1. A ball bearing having more than two ball series and a track for the same, the transversal profile of which is curve shaped with the center point situated on the center line of the shaft, the outer bearing part and the inner bearing part being each integrally formed from a single piece of metal and adjustable to each other or turnable in a plane containing the axis of the shaft and around the said center point, substantially as described and shown in the drawings.

2. The herein described improved ball bearing having inner and outer members each integrally formed from a single piece of metal, the inner member having three peripheral tracks extended around it, the two outer tracks forming oppositely arranged shoulders, and ball sets arranged in said tracks of the inner member, the outer member having a concave spherical inner surface struck from a center point positioned at the rotative axis of the inner member and midway between the outer ball sets and affording concentric tracks having spherical bearing surfaces reversely inclined to the rotative axis of the inner member and opposite to the said shoulders, the outer ball sets being interposed between said shoulders of the inner member and the respective reversely inclined bearing surfaces of the outer member to transmit end thrust imposed upon said inner member, the intermediate ball set being interposed between its track faces and adapted to transmit radial load, said inner member being capable of universal turning movement around said center point to facilitate the introduction and withdrawal of the ball sets within and from said outer member.

3. The herein described improved combined radial and thrust ball bearing having inner and outer members, the inner member having three permanently related peripheral tracks extended around it, the two outer tracks forming oppositely arranged shoulders and ball sets arranged in said tracks of the inner member, the outer member having concave spherical inner surface struck from a center point positioned at the rotative axis of the inner member and between the outer ball sets and affording concentric tracks having spherical bearing surfaces reversely inclined to the rotative axis of the inner member and opposite to the tracks on the inner member, the outer ball sets being adapted to resist end thrust and the intermediate ball set being adapted to sustain radial load, said inner member being capable of universal turning movement around said center point to facilitate the introduction and withdrawal of the ball sets within and from said outer member.

4. The improved combined radial and thrust ball bearing having inner and outer members each integrally formed from a single piece of metal, said members being provided with coöperative ball tracks for sustaining radial load and coöperative ball tracks for resisting end thrust in each direction, and ball sets between said members and engaging said ball tracks.

5. A combined radial and thrust bearing comprising an inner and an outer bearing member, the inner bearing member having three grooves forming unbroken and permanently related tracks, a ball set mounted on each track, and the outer member having hollow spherical unbroken and permanently related tracks for said balls struck from a center point positioned on the axis of rotation and at or near the plane of the balls of the center set, the outer ball sets being adapted to resist end thrust and the intermediate ball set being adapted to sustain radial load, said inner member being capable of universal turning movement around said center point to facilitate the introduction and withdrawal of the ball sets within and from said outer member.

6. A combined radial and thrust bearing comprising an inner and an outer bearing member, the inner bearing member having three grooves forming unbroken tracks, the center track being of greater radius from the axis of rotation than either of the other tracks, a ball set mounted on each track, and the outer member having hollow spherical unbroken tracks for said balls struck from a center point positioned on the said axis within the bearing and nearer the plane of the center ball set than that of either of the others, the said inner member and the ball sets being capable of a tilting movement around said center point to bring the balls outside the outer member.

7. A combined radial and thrust bearing comprising an inner and an outer bearing member, the inner bearing member having three grooves forming unbroken and permanently related tracks, the center tracks being of greater radius from the axis of rotation than either of the other tracks, a ball set mounted on each track, and the outer member having hollow spherical unbroken and permanantly related tracks for said balls struck from a center point positioned on the said axis within the bearing and nearer the plane of the center ball set, than that of either of the others, the said inner member and the ball sets being capable of a tilting movement around said center point to bring the balls outside the outer member.

8. A combined radial and thrust bearing comprising an inner and an outer bearing member, the inner bearing member having three grooves forming unbroken tracks, the center track being of greater radius from the axis of rotation than either of the other tracks, a ball set mounted on each track, and the outer member having hollow spherical unbroken tracks for said balls struck from a center point positioned on the said axis within the plane of the center ball set, the said inner member and the ball sets being capable of a tilting movement around said center point to bring the balls outside the outer member.

9. A combined radial and thrust bearing comprising an inner and an outer bearing member, the inner bearing member having three grooves forming unbroken and permanently related tracks, the center track being of greater radius from the axis of rotation than either of the other tracks, a ball set mounted on each track, and the outer member having hollow spherical unbroken and permanently related tracks for said balls struck from a center point positioned on the said axis within the plane of the center ball set, the said inner member and the ball sets being capable of a tilting movement around said center point to bring the balls outside the outer member.

10. A combined radial and thrust bearing comprising an inner and an outer bearing member, the inner bearing member having three grooves forming unbroken tracks, one of said tracks being of greater radius from the axis of rotation than either of the other tracks, a ball set mounted on each track, and the outer member having hollow spherical unbroken tracks for said balls struck from a center point positioned on the said axis within the bearing and nearer the plane of the ball set having the greatest radius than that of either of the others, the said inner members and the ball sets being capable of a tilting movement around said center point to bring the balls outside the outer member.

11. A combined radial and thrust bearing comprising an inner and an outer bearing member, the inner bearing member having three grooves forming unbroken and permanently related tracks, one of said tracks being of greater radius from the axis of rotation than either of the other tracks, a ball set mounted on each track, and the outer member having hollow spherical unbroken and permanently related tracks for said balls struck from a center point positioned on the said axis within the bearing and nearer the plane of the ball set having the greatest radius than that of either of the others, the said inner member and the ball sets being capable of a tilting movement around said center point to bring the balls outside the outer member.

SVEN GUSTAF WINGQUIST.